United States Patent
Ponnuru et al.

(10) Patent No.: US 11,997,124 B2
(45) Date of Patent: May 28, 2024

(54) OUT-OF-BAND MANAGEMENT SECURITY ANALYSIS AND MONITORING

(71) Applicant: EMC IP Holding Company LLC, Hopkinton, MA (US)

(72) Inventors: Viswanath Ponnuru, Bangalore (IN); Raveendra Babu Madala, Bangalore (IN); Santosh Hanamant Gore, Bangalore (IN); Shuva Brata Deb, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 995 days.

(21) Appl. No.: 16/398,984

(22) Filed: Apr. 30, 2019

(65) Prior Publication Data

US 2020/0351293 A1 Nov. 5, 2020

(51) Int. Cl.
*H04L 9/00* (2022.01)
*H04L 9/40* (2022.01)

(52) U.S. Cl.
CPC .......... *H04L 63/1433* (2013.01); *H04L 63/20* (2013.01)

(58) Field of Classification Search
CPC ............................ H04L 63/1433; H04L 63/20
See application file for complete search history.

(56) References Cited

U.S. PATENT DOCUMENTS

| | | | |
|---|---|---|---|
| 7,831,997 B2 | 11/2010 | Eldar et al. | |
| 8,996,691 B1 | 3/2015 | Stickle et al. | |
| 9,525,608 B2 | 12/2016 | Chen et al. | |
| 2006/0095961 A1* | 5/2006 | Govindarajan | H04L 63/1416 726/15 |
| 2008/0052698 A1* | 2/2008 | Olson | G06F 9/44536 717/168 |
| 2008/0270827 A1* | 10/2008 | Brandyberry | G06F 11/0724 714/11 |
| 2017/0346846 A1* | 11/2017 | Findlay | H04L 63/20 |
| 2018/0225188 A1* | 8/2018 | Meriac | G06F 21/563 |

(Continued)

OTHER PUBLICATIONS

RSA, Unified Data Model for the RSA NetWitness® Platform, https://community.rsa.com/community/products/netwitness/rsa-content/udm, Apr. 29, 2019.

*Primary Examiner* — Christopher J Brown
(74) *Attorney, Agent, or Firm* — Ryan, Mason & Lewis, LLP

(57) ABSTRACT

Methods, apparatus, and processor-readable storage media for out-of-band management security analysis and monitoring are provided herein. An example computer-implemented method includes generating control state configuration profiles for hardware components of at least one out-of-band server management controller, collecting data from the at least one out-of-band management controller via one or more interfaces, analyzing the collected data by comparing the collected data to the one or more control state configuration profiles and applying at least one rule-based engine to the collected data, and generating a notification of one or more security vulnerabilities associated with the at least one out-of-band server management controller based at least in part on the analyzing of the collected data, wherein the notification is to be utilized in connection with one or more security-related actions on at least a portion of at least one server.

20 Claims, 6 Drawing Sheets

(56) References Cited

U.S. PATENT DOCUMENTS

| | | | |
|---|---|---|---|
| 2019/0363894 A1* | 11/2019 | Kumar Ujjwal | H04L 9/3268 |
| 2020/0005093 A1* | 1/2020 | Vichare | G06F 18/22 |
| 2020/0134184 A1* | 4/2020 | Bhatia | G06F 8/65 |
| 2020/0134192 A1* | 4/2020 | Gupta | G06F 8/65 |
| 2020/0310779 A1* | 10/2020 | Van Heuklon | G06F 8/65 |

* cited by examiner

FIG. 5

```
OEM_Device(1..n)_Monitoring_Control {
    DeviceID: OEM device ID (iDRAC Identifier)
    Firmware Version: 20.20.21
    Checksum: SHA1....
    FirmwareLastUpdate: Updated date and time
    Administrator ID: Administrator ID
    ContextFirmwareUpdate: Reason for the update
    DependencyComponentList: The firmware image and
                            its component dependency signatures
    ...
}
```

FIG. 6

GENERATE CONTROL STATE CONFIGURATION PROFILES FOR HARDWARE COMPONENTS OF AN OUT-OF-BAND SERVER MANAGEMENT CONTROLLER, WHEREIN EACH CONTROL STATE CONFIGURATION PROFILE COMPRISES HARDWARE COMPONENT IDENTIFICATION INFORMATION AND CONFIGURATION STATE INFORMATION — 600

↓

COLLECT DATA FROM THE OUT-OF-BAND MANAGEMENT CONTROLLER VIA ONE OR MORE INTERFACES — 602

↓

ANALYZE THE COLLECTED DATA BY COMPARING THE COLLECTED DATA TO THE CONTROL STATE CONFIGURATION PROFILES AND APPLYING A RULE-BASED ENGINE TO THE COLLECTED DATA — 604

↓

GENERATE AN OUTPUT COMPRISING A NOTIFICATION OF SECURITY VULNERABILITIES ASSOCIATED WITH THE OUT-OF-BAND SERVER MANAGEMENT CONTROLLER BASED ON THE ANALYZING OF THE COLLECTED DATA — 606

OUT-OF-BAND MANAGEMENT SECURITY ANALYSIS AND MONITORING

FIELD

The field relates generally to information processing systems, and more particularly to techniques for providing security in such systems.

BACKGROUND

Conventional endpoint security tools typically support host-based security analysis and monitoring. However, high performance computing (HPC) server life-cycle management tasks include, for example, pre-boot execution, bare metal configurations, and zero-touch configuration, and such tasks are susceptible to network attacks due to faulty configurations or insider attacker scenarios. While conventional endpoint security tools are usually capable of monitoring host-based intrusions, many such tools are incapable of performing other types of tasks.

SUMMARY

Illustrative embodiments of the disclosure provide techniques for out-of-band management security analysis and monitoring. An exemplary computer-implemented method includes generating one or more control state configuration profiles for one or more hardware components of at least one out-of-band server management controller, wherein each control state configuration profile includes hardware component identification information and configuration state information. Such a method also includes collecting data from the at least one out-of-band management controller via one or more interfaces, and analyzing the collected data by comparing the collected data to the one or more control state configuration profiles and applying at least one rule-based engine to the collected data. Further, such a method includes generating an output comprising a notification of one or more security vulnerabilities associated with the at least one out-of-band server management controller based at least in part on the analyzing of the collected data, wherein the output is to be utilized in connection with one or more security-related actions on at least a portion of at least one server.

Illustrative embodiments can provide significant advantages relative to conventional endpoint security tools. For example, challenges associated with being incapable of performing a security threat analysis of HPC servers utilizing out-of-band management controllers are overcome via extending a server management controller to function as an endpoint security agent that monitors various aspects of the hardware sub-system, security violations, and configuration states.

These and other illustrative embodiments described herein include, without limitation, methods, apparatus, systems, and computer program products comprising processor-readable storage media.

BRIEF DESCRIPTION OF THE DRAWINGS

FIG. 5 shows an example input profile in an illustrative embodiment.

FIG. 6 is a flow diagram of a process for out-of-band management security analysis and monitoring in an illustrative embodiment.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
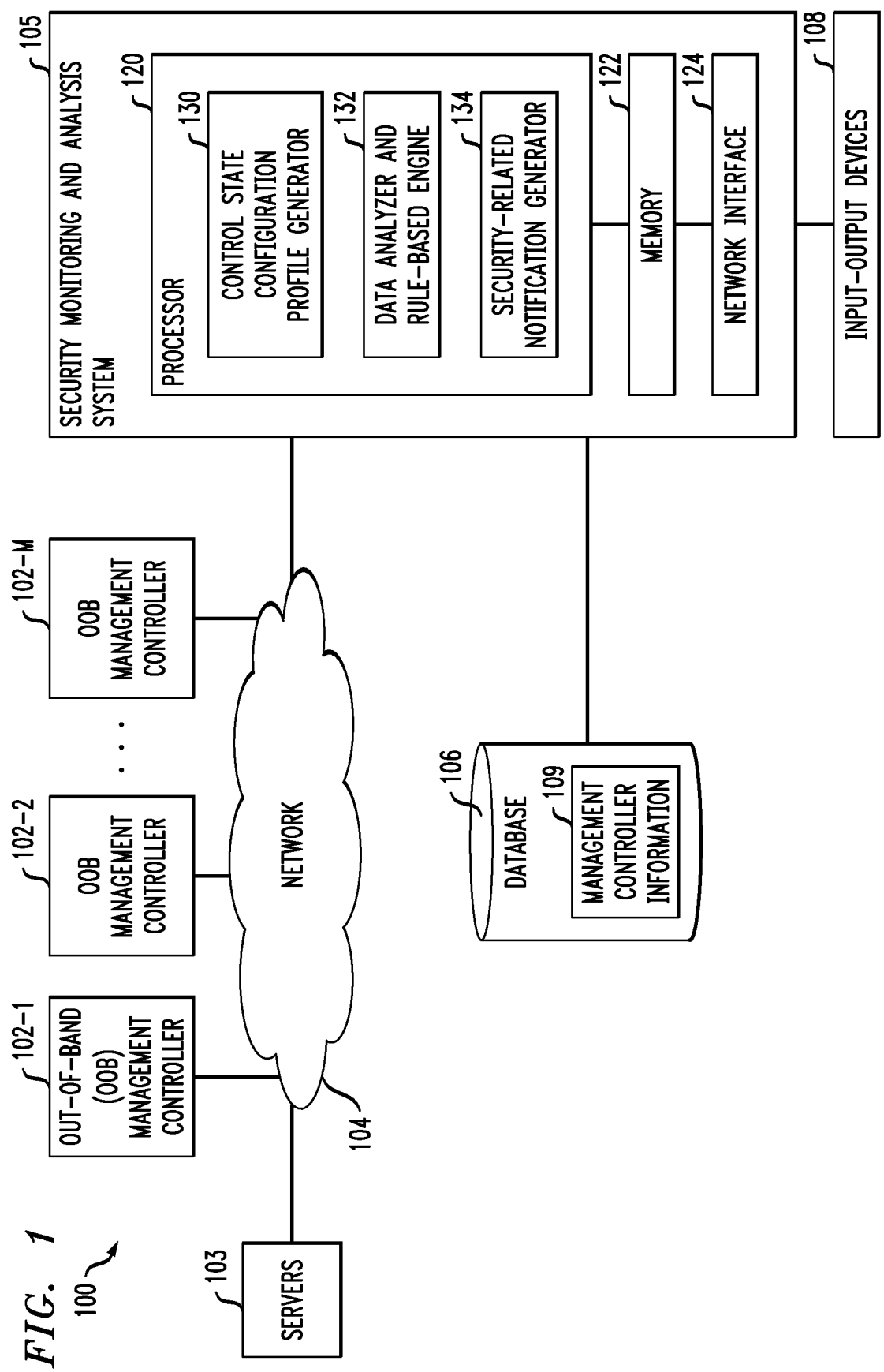
FIG. 1 shows an information processing system configured for out-of-band management security analysis and monitoring in an illustrative embodiment.

FIG. 1 shows a computer network (also referred to herein as an information processing system) 100 configured in accordance with an illustrative embodiment. The computer network 100 comprises a plurality of out-of-band (OOB) management controllers 102-1, 102-2, . . . 102-M, collectively referred to herein as OOB management controllers 102. The OOB management controllers 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is security monitoring and analysis system 105, as well as servers 103 (which can execute and/or carry out one or more security-related actions in connection with security monitoring and analysis system 105, for example).

The OOB management controllers 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The OOB management controllers 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art. Additionally, in one or more embodiments, OOB management controllers 102 can be incorporated and/or associated with one or more of the servers 103.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the security monitoring and analysis system 105 can have an associated database 106 configured to store data 109 pertaining to management controller information, which comprise, for example, firmware and hardware information and/or related activity data.

The database 106 in the present embodiment is implemented using one or more storage systems associated with the security monitoring and analysis system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the security monitoring and analysis system 105 are input-output devices 108, which illustratively comprise keyboards, displays or other types of input-output devices in any combination. Such input-output devices can be used, for example, to support one or more user interfaces to the security monitoring and analysis system 105, as well as to support communication between the security monitoring and analysis system 105 and other related systems and devices not explicitly shown.

The security monitoring and analysis system 105 in the FIG. 1 embodiment is assumed to be implemented using at least one processing device. Each such processing device generally comprises at least one processor and an associated memory, and implements one or more functional modules for controlling certain features of the security monitoring and analysis system 105.

More particularly, the security monitoring and analysis system 105 in this embodiment each can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the security monitoring and analysis system 105 to communicate over the network 104 with the OOB management controllers 102, and illustratively comprises one or more conventional transceivers.

The processor 120 further comprises a control state configuration profile generator 130, a data analyzer and rule-based engine 132, and a security-related notification generator 134.

It is to be appreciated that this particular arrangement of modules 130, 132 and 134 illustrated in the processor 120 of the FIG. 1 embodiment is presented by way of example only, and alternative arrangements can be used in other embodiments. For example, the functionality associated with the modules 130, 132 and 134 in other embodiments can be combined into a single module, or separated across a larger number of modules. As another example, multiple distinct processors can be used to implement different ones of the modules 130, 132 and 134 or portions thereof.

At least portions of the control state configuration profile generator 130, data analyzer and rule-based engine 132, and security-related notification generator 134 may be implemented at least in part in the form of software that is stored in memory 122 and executed by processor 120.

It is to be understood that the particular set of elements shown in FIG. 1 for OOB management security analysis and monitoring involving OOB management controllers 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing control state configuration profile generator 130, data analyzer and rule-based engine 132, and security-related notification generator 134 of an example security monitoring and analysis system 105 in computer network 100 will be described in more detail with reference to the flow diagram of FIG. 6.

As detailed herein, in one or more embodiments, a server (such as an HPC server, for example) can include a special hardware controller that contains its own processor, memory, network connection and access to a system bus. Such a hardware controller is also referred to herein as a management controller (such as, for example, an Integrated Dell Remote Access Controller (iDRAC)). By way of further example, such a management controller (e.g., the iDRAC) can be implemented as an out-of-band management platform on one or more servers. Such a platform may be provided, for example, on a separate expansion card or integrated into the main board (when integrated, the platform is referred to as iDRAC).

Additionally, in contrast to disadvantageous conventional endpoint security tools, the techniques and systems detailed herein are capable of monitoring and/or performing security threat analysis of OOB management controllers and management networks. The management controllers provide various remote administrator capabilities such as, for example, bare metal configurations, server life-cycle management tasks, zero-touch configurations, etc., via separate management networks. Using disadvantageous conventional endpoint security tools, security threats within out-of-band management networks and configurations are unnoticed, rendering datacenter networks susceptible to network attacks.

Accordingly, as described herein, at least one embodiment includes providing agent-less security analysis capabilities from out-of-band management networks.

Figure 2:
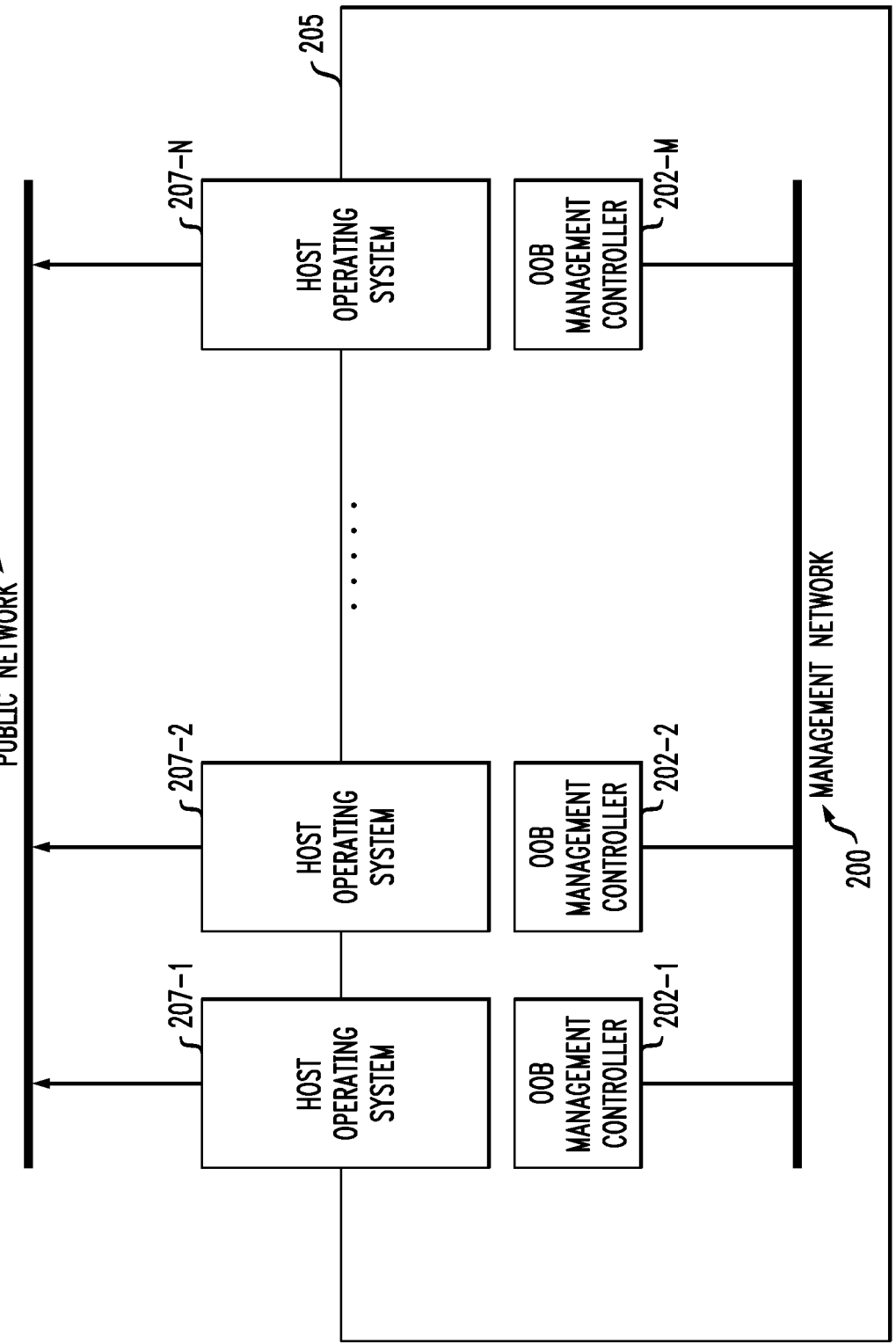
FIG. 2 shows example system architecture in an illustrative embodiment.

FIG. 2 shows example system architecture in an illustrative embodiment. By way of illustration, FIG. 2 depicts a management network 200 and a public network 208. The management network 200 includes, as part of security monitoring and analysis system 205, OOB management controllers 202-1, 202-2, . . . 202-M (collectively referred to as OOB management controllers 202). In one or more embodiments, such OOB management controllers 202 can be incorporated into and/or associated with one or more enterprise servers. As also depicted in FIG. 2, OOB management controllers 202 are connected to host operating systems 207-1, 207-2, . . . 207-N (collectively referred to as host operating systems 207), which operate on the public network 208.

In one or more embodiments, OOB management controllers 202 include HPC server baseboard management controllers (BMC), which encompass a type of management controller with remote capabilities. Such a BMC is a specialized service processor that monitors the physical state of one or more computers (such as host operating systems 207) using one or more sensors, and communicates with the system administrator (within management network 200, for example) through an independent network interface. It is noted that original equipment manufacturer (OEM) vendors can provide enhanced capabilities of BMCs with proprietary technologies (such as, for example, iDRAC) for managing system configurations of the computer systems via one or more defined protocols.

Additionally, endpoint security tools (which detects malicious activity, malware, etc. by end users) monitor activities from the host operating system perspective. As OEM vendors use proprietary technologies embedded in the management controllers, it can be challenging for such endpoint security tools to perform data analysis of the management network. Accordingly, one or more embodiments include providing a system and techniques for gaining visibility into HPC server management controller hardware remotely and detecting firmware anomalies, policy violations, vulnerabilities, attacked and compromised machines, etc. in an enterprise network.

Figure 3:
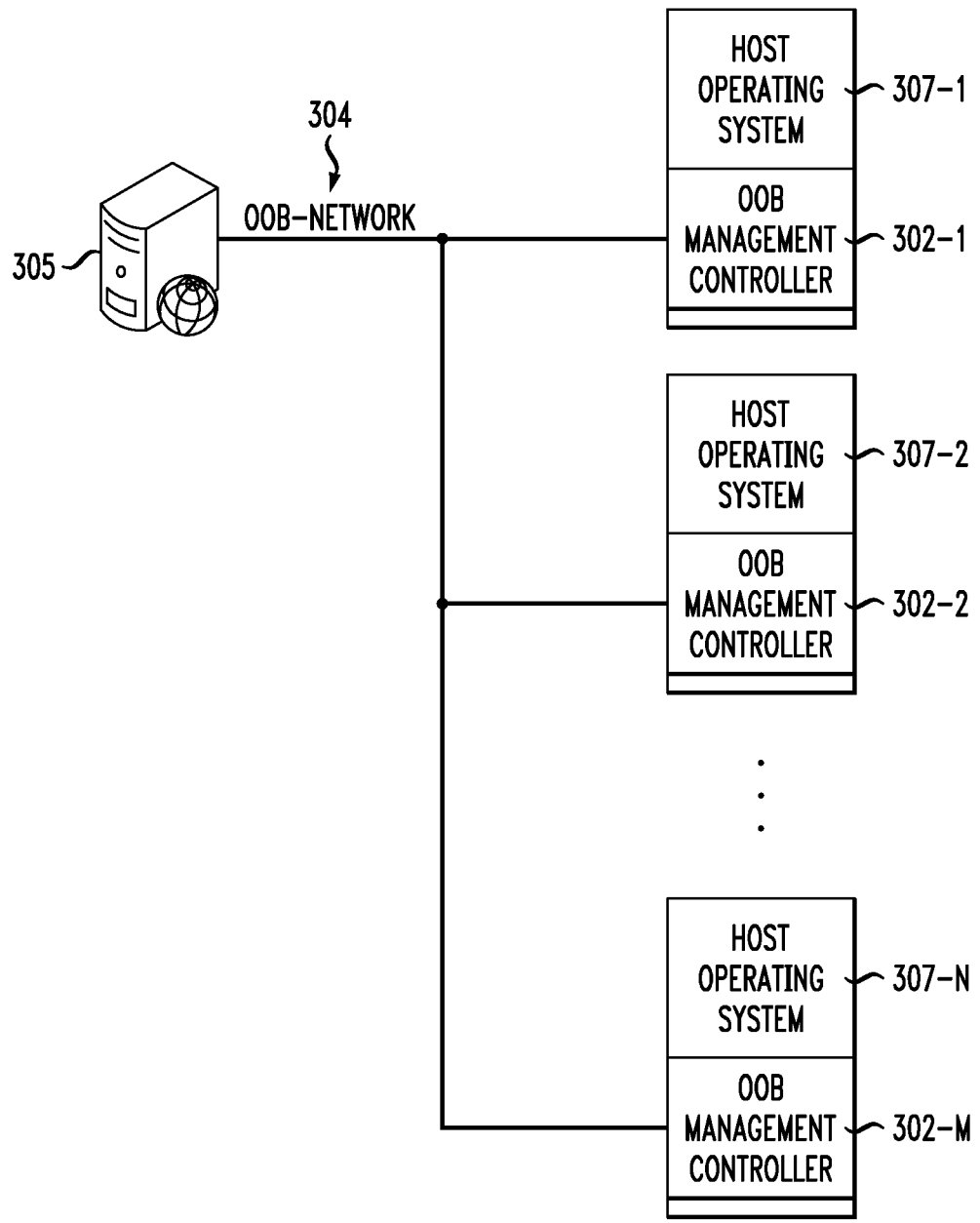
FIG. 3 shows example system architecture in an illustrative embodiment.

FIG. 3 shows example system architecture in an illustrative embodiment. By way of illustration, FIG. 3 depicts a security monitoring and analysis system 305, which connects (via OOB network 304) to OOB management controllers 302-1, 302-2, . . . 302-M (collectively OOB management controllers 302). As also depicted in FIG. 3, the OOB management controllers 302 are linked and/or connected to respective host operating systems 307-1, 307-2, . . . 307-N (collectively referred to as host operating systems 307).

Accordingly, as illustrated in the FIG. 3, example, at least one embodiment includes providing security threat analytics and monitoring of HPC server management controllers (302). Such an embodiment enables leveraging of platform data monitoring via out-of-band network 304 using one or more system management interfaces. Accordingly, such an embodiment enables identifying hardware and/or firmware components vulnerable to security threats (via the use, for example, of historical data), as well as implementing rules to classify device and/or platform attributes and/or settings in an endpoint security tool. Also, such an embodiment enables detecting OEM-agnostic hardware and/or firmware anomalies via standard system management interfaces, using telemetry (for example, from iDRAC) to share logs with an endpoint security tool, and expanding monitoring capabilities to include hardware security, adding to the overall fitness level of a network and/or the systems therein.

Figure 4:
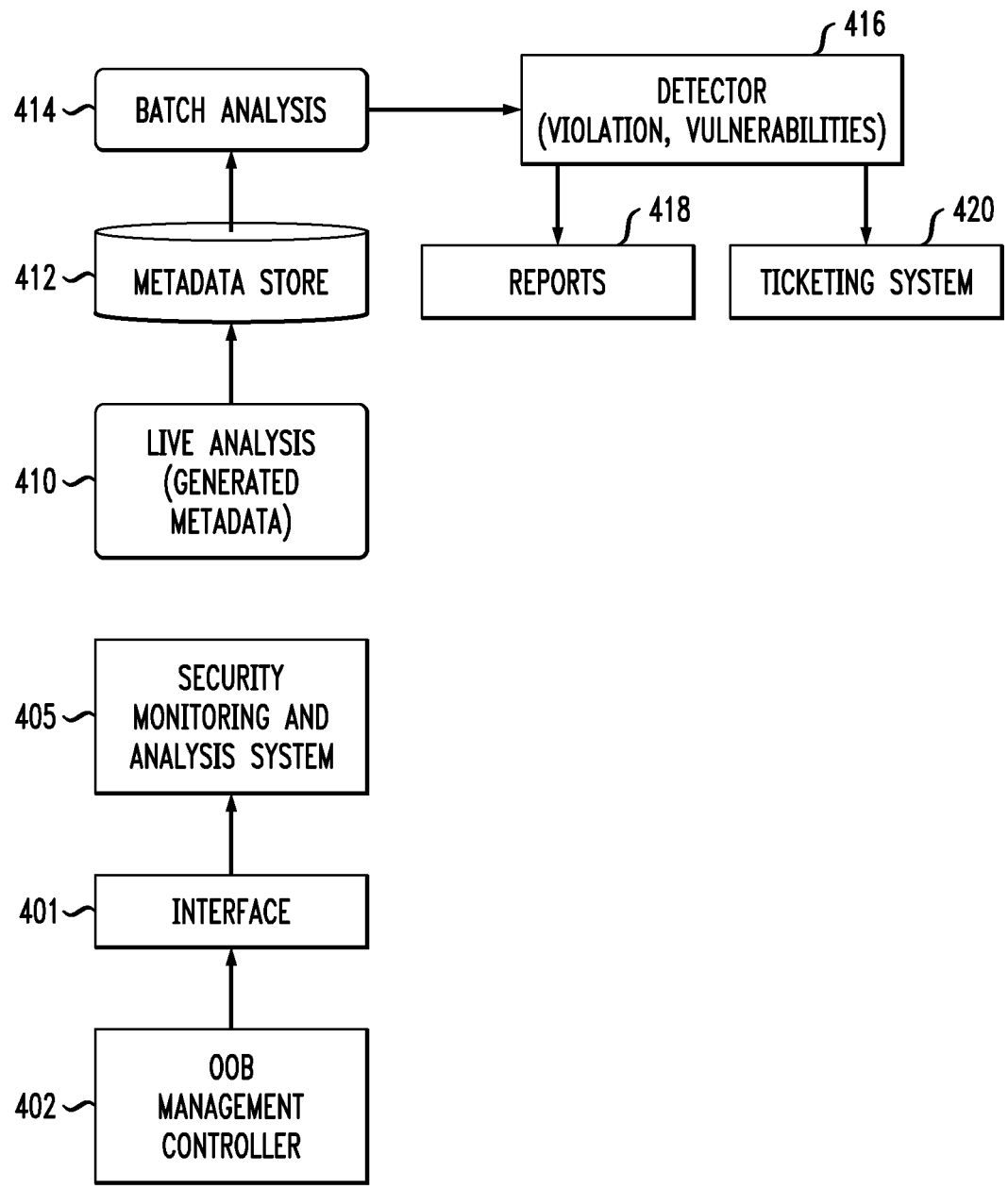
FIG. 4 shows an example solution workflow in an illustrative embodiment.

FIG. 4 shows an example solution workflow in an illustrative embodiment. As illustrated, FIG. 4 shows an OOB management controller 402 (which is running even before a corresponding host device/operating system is turned on) providing information, via an interface 401, to a security monitoring and analysis system 405. In at least one embodiment, OOB management controller 402 modifies metadata to post event-related metadata (to security monitoring and analysis system 405) in an agent-specific format (that is, in a format acceptable to the security monitoring and analysis system 405). Such metadata can include metadata generated as a result of a scheduled scan of inventory components (including hardware and firmware) and state information related thereto.

FIG. 4 also depicts actions subsequently carried out by security monitoring and analysis system 405 via steps 410 through 420. By way of example, step 410 includes performing analysis of metadata related to live events provided by the OOB management controller 402, and step 412 includes storing such metadata in a database and/or store. Such live events include, for example, events that indicate a change of state of any monitored component (hardware or firmware). The new information derived from such events are posted and/or stored in step 412, and a list of relevant metadata can also be defined and/or generated in one or more embodiments.

Step 414 includes performing batch analysis on at least a portion of the processed and/or stored metadata, and based at least in part on such batch analysis, step 416 includes detecting one or more security-related violations or vulnerabilities (with respect to the OOB management controller 402). Such batch analysis can include, for example, comparison of the new metadata to historical data related to state information of relevant (hardware and/or firmware) components. Relatedly, the detector component implemented in step 416 seeks to identify anomalous firmware and/or hardware activity via the use of a rule-based engine.

Based on the detections in step 416, step 418 includes generating one or more reports (to be provided to one or more security-related entities) and step 420 includes providing one or more notifications to a ticketing system (for one or more automated security-related actions to be carried out). Such outputs generated in steps 418 and 420 include the identification of suspicious and/or malicious firmware and/or hardware activity. In one or more embodiments, an automated remediation action can be carried out (for example, a lockdown of the host device can be implemented (thereby not permitting updates)).

Accordingly, at least one embodiment includes providing agent-less visibility into various OEM devices to detect security vulnerabilities and/or policy violations within embedded management controllers. Such an embodiment also includes providing reporting and notification capabilities to the enterprise security products using standard management interfaces, as well as defining security policies and/or rules for platform and/or device attributes in an enterprise security product, and providing one or more recommendations to users to change one or more settings to better secure a server. Additionally, one or more embodiments include providing insights by monitoring a user/device and access activities of a management controller by comparing such monitored data with similar data derived from one or more other servers.

FIG. 5 shows an example input profile 500 in an illustrative embodiment. In at least one embodiment, all (hardware and/or firmware) components being monitored would have a corresponding input profile similar to the example input profile 500 depicted in FIG. 5. Also, one or more embodiments include generating such input profiles for the components being/to be monitored, as well as updating information in any such input profile any time a proper update (to the corresponding component) occurs.

As such, in accordance with at least one embodiment, a server management controller (e.g., iDRAC) is extended to act as an endpoint security agent that monitors various aspects of hardware (and/or firmware) sub-system security violations and configuration states. In such an embodiment, the monitoring controls are abstracted to external interfaces for seamless integrations with any OEM vendors. As shown, for example, in FIG. 5, monitoring of a control state configuration map (also referred to herein as an input profile) includes hardware component identifiers and various configuration state definitions that help the endpoint security agent to detect the runtime anomalies and report notifications. Such monitoring controls can be, for example, pre-defined as a solution offering. Additionally, such controls can be extended to various hardware and/or firmware components.

Such embodiments can be implemented in various use cases. For instance, an example embodiment implemented in use cases related to management controller access and/or authentication can include preventing brute force login attacks from management controller interfaces, monitoring login failures from one or more accounts, monitoring logins from different network domains, monitoring logins during unusual temporal periods, adding, editing, and/or deleting users from a management controller, changing user access policies, etc. Additionally, an example embodiment implemented in use cases related to configuration policy violations can include monitoring attempts to update firmware and/or configurations while in lockdown mode, monitoring verification failures for update packages, monitoring changes to a configuration and/or firmware update of a device from a non-specified vendor application or tool, monitoring the time of previous updates, etc. Further, an example embodiment implemented in use cases related to usage levels can include monitoring central processing unit (CPU) power fluctuations, CPU temperature sensors, chassis temperature sensors, and/or workload statistics to determine and/or identify malicious attacks related to power usage, as well as monitoring management network activities from a management controller.

FIG. 6 is a flow diagram of a process for out-of-band management security analysis and monitoring in an illustrative embodiment. It is to be understood that this particular process is only an example, and additional or alternative processes can be carried out in other embodiments.

In this embodiment, the process includes steps 600 through 606. These steps are assumed to be performed by the processor 120 utilizing its modules 130, 132 and 134.

Step 600 includes generating one or more control state configuration profiles for one or more hardware components of at least one out-of-band server management controller, wherein each control state configuration profile comprises hardware component identification information and configuration state information. The control state configuration profiles can include one or more control state configuration profiles specific to one or more original equipment manufacturer platform hardware components. Additionally, the configuration state information can include firmware version information, update information, and/or dependency information. Also, in at least one embodiment, the at least one out-of-band server management controller is embedded within the at least one server.

In one or more embodiments, generating the one or more control state configuration profiles is based at least in part on information derived from one or more additional servers. Further, one or more embodiments also include updating the one or more control state configuration profiles subsequent to an update to at least a portion of the one or more hardware components of the at least one out-of-band server management controller.

Step 602 includes collecting data from the at least one out-of-band management controller via one or more interfaces. Collecting the data from the at least one out-of-band management controller can include collecting data pertaining to firmware-related activity from the at least one out-of-band management controller and/or hardware-related activity from the at least one out-of-band management controller. Additionally, in at least one embodiment, collecting the data from the at least one out-of-band management controller is carried out by at least one enterprise endpoint security system.

Step 604 includes analyzing the collected data by comparing the collected data to the one or more control state configuration profiles and applying at least one rule-based engine to the collected data. The at least one rule-based engine can include at least one set of original equipment manufacturer-agnostic security policies for monitoring and analyzing one or more hardware security-related issues.

Step 606 includes generating an output comprising a notification of one or more security vulnerabilities associated with the at least one out-of-band server management controller based at least in part on the analyzing of the collected data, wherein the output is to be utilized in connection with one or more security-related actions on at least a portion of at least one server. The security vulnerabilities can include a firmware attack, a signature failure, a pre-boot configuration error, a firmware compliance issue, a driver compliance issue, etc. Additionally, the security vulnerabilities can include one or more security vulnerabilities attributed to one or more end-user devices within the at least one server linked to the at least one out-of-band server management controller. Also, in at least one embodiment, the at least one server includes at least one HPC server.

Additionally, the techniques depicted in FIG. 6 can also include providing the output to one or more enterprise security information event management tools. Further, one or more embodiments include transmitting the output, via at least one interface, to one or more security-related entities associated with the at least one server.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to perform security threat analyses of HPC servers utilizing out-of-band management controllers. These and other embodiments can effectively extend a server management controller to function as an endpoint security agent that monitors various aspects of a hardware sub-system, related security violations, and corresponding configuration states.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of a computer system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
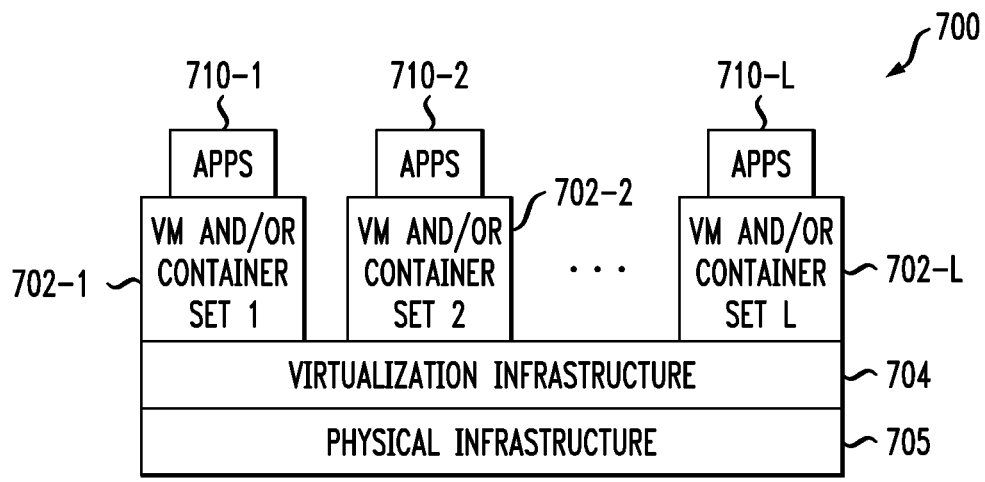
FIGS. 7 and 8 show examples of processing platforms that may be utilized to implement at least a portion of an information processing system in illustrative embodiments.
Figure 8:
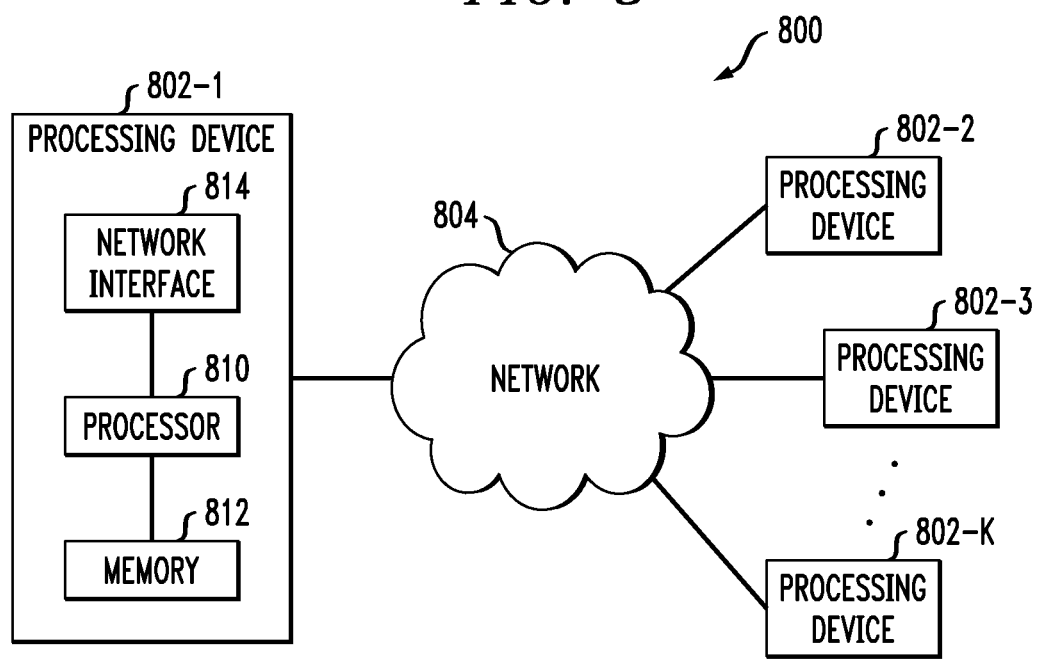

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

An example of a hypervisor platform used to implement a hypervisor within the virtualization infrastructure 704 is the VMware® vSphere® which has an associated virtual infrastructure management system such as the VMware® vCenter™. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
generating one or more control state configuration profiles for one or more hardware components of at least one out-of-band server management controller, wherein each control state configuration profile comprises hardware component identification information and configuration state information;
collecting data from the at least one out-of-band management controller via one or more interfaces;
analyzing the collected data by comparing the collected data to the one or more control state configuration profiles and applying at least one rule-based engine to the collected data, wherein applying the at least one rule-based engine to the collected data comprises identifying one or more firmware anomalies and one or more hardware anomalies attributed to one or more end-user devices coupled to at least one server coupled to the at least one out-of-band server management controller, by processing at least a portion of the collected data using one or more rules of the at least one rule-based engine;
generating an output comprising a notification of one or more security vulnerabilities, related to at least a portion of the one or more firmware anomalies and the one or more hardware anomalies, associated with the at least one out-of-band server management controller based at least in part on the comparing of the collected data to the one or more control state configuration profiles and the applying of the at least one rule-based engine to the collected data, wherein the one or more security vulnerabilities associated with the at least one out-of-band server management controller comprise one or more security vulnerabilities attributed to at least a portion of the one or more end-user devices coupled to the at least one server coupled to the at least one out-of-band server management controller;
automatically disabling at least a portion of the one or more end-user devices in response to the notification of one or more security vulnerabilities; and providing at least a portion of the output to one or more enterprise security information event management tools, wherein providing the at least a portion of the output to the one or more enterprise security information event management tools comprises configuring at least a portion of the one or more enterprise security information event management tools with one or more rules, based at least in part on the at least a portion of the output, to classify at least one of one or more device attributes and one or more device settings as one or more security vulnerabilities in the one or more enterprise security information event management tools;

wherein the method is performed by at least one processing device comprising a processor coupled to a memory.

2. The computer-implemented method of claim 1, wherein the one or more control state configuration profiles comprise one or more control state configuration profiles specific to one or more original equipment manufacturer platform hardware components.

3. The computer-implemented method of claim 1, wherein the at least one rule-based engine comprises at least one set of original equipment manufacturer-agnostic security policies for monitoring and analyzing one or more hardware security-related issues.

4. The computer-implemented method of claim 1, wherein the one or more security vulnerabilities comprise at least one of a firmware attack, a signature failure, a pre-boot configuration error, a firmware compliance issue, and a driver compliance issue.

5. The computer-implemented method of claim 1, wherein the at least one out-of-band server management controller is embedded within the at least one server.

6. The computer-implemented method of claim 1, wherein generating the one or more control state configuration profiles is based at least in part on information derived from one or more additional servers.

7. The computer-implemented method of claim 1, wherein the at least one server comprises at least one high performance computing server.

8. The computer-implemented method of claim 1, wherein the configuration state information comprises at least one of firmware version information, update information, and dependency information.

9. The computer-implemented method of claim 1, further comprising:
updating the one or more control state configuration profiles subsequent to an update to at least a portion of the one or more hardware components of the at least one out-of-band server management controller.

10. The computer-implemented method of claim 1, wherein collecting the data from the at least one out-of-band management controller comprises collecting data pertaining to at least one of firmware-related activity from the at least one out-of-band management controller and hardware-related activity from the at least one out-of-band management controller.

11. The computer-implemented method of claim 1, wherein collecting the data from the at least one out-of-band management controller is carried out by at least one enterprise endpoint security system.

12. The computer-implemented method of claim 1, further comprising:
transmitting the output, via at least one interface, to one or more security-related entities associated with the at least one server.

13. A non-transitory processor-readable storage medium having stored therein program code of one or more software programs, wherein the program code when executed by at least one processing device causes the at least one processing device:
to generate one or more control state configuration profiles for one or more hardware components of at least one out-of-band server management controller, wherein each control state configuration profile comprises hardware component identification information and configuration state information;
to collect data from the at least one out-of-band management controller via one or more interfaces;
to analyze the collected data by comparing the collected data to the one or more control state configuration profiles and applying at least one rule-based engine to the collected data, wherein applying the at least one rule-based engine to the collected data comprises identifying one or more firmware anomalies and one or more hardware anomalies attributed to one or more end-user devices coupled to at least one server coupled to the at least one out-of-band server management controller, by processing at least a portion of the collected data using one or more rules of the at least one rule-based engine;
to generate an output comprising a notification of one or more security vulnerabilities, related to at least a portion of the one or more firmware anomalies and the one or more hardware anomalies, associated with the at least one out-of-band server management controller based at least in part on the comparing of the collected data to the one or more control state configuration profiles and the applying of the at least one rule-based engine to the collected data, wherein the one or more security vulnerabilities associated with the at least one out-of-band server management controller comprise one or more security vulnerabilities attributed to at least a portion of the one or more end-user devices coupled to the at least one server coupled to the at least one out-of-band server management controller;
to automatically disable at least a portion of the one or more end-user devices in response to the notification of one or more security vulnerabilities; and
to provide at least a portion of the output to one or more enterprise security information event management tools, wherein providing the at least a portion of the output to the one or more enterprise security information event management tools comprises configuring at least a portion of the one or more enterprise security information event management tools with one or more rules, based at least in part on the at least a portion of the output, to classify at least one of one or more device attributes and one or more device settings as one or more security vulnerabilities in the one or more enterprise security information event management tools.

14. The non-transitory processor-readable storage medium of claim 13, wherein the configuration state information comprises one or more of firmware version information, update information, and dependency information.

15. The non-transitory processor-readable storage medium of claim 13, wherein collecting the data from the at least one out-of-band management controller comprises collecting data pertaining to firmware-related activity from the at least one out-of-band management controller, and collecting data pertaining to hardware-related activity from the at least one out-of-band management controller.

16. An apparatus comprising:
at least one processing device comprising a processor coupled to a memory;
the at least one processing device being configured:
- to generate one or more control state configuration profiles for one or more hardware components of at least one out-of-band server management controller, wherein each control state configuration profile comprises hardware component identification information and configuration state information;
- to collect data from the at least one out-of-band management controller via one or more interfaces;
- to analyze the collected data by comparing the collected data to the one or more control state configuration profiles and applying at least one rule-based engine to the collected data, wherein applying the at least one rule-based engine to the collected data comprises identifying one or more firmware anomalies and one or more hardware anomalies attributed to one or more end-user devices coupled to at least one server coupled to the at least one out-of-band server management controller, by processing at least a portion of the collected data using one or more rules of the at least one rule-based engine;
- to generate an output comprising a notification of one or more security vulnerabilities, related to at least a portion of the one or more firmware anomalies and the one or more hardware anomalies, associated with the at least one out-of-band server management controller based at least in part on the comparing of the collected data to the one or more control state configuration profiles and the applying of the at least one rule-based engine to the collected data, wherein the one or more security vulnerabilities associated with the at least one out-of-band server management controller comprise one or more security vulnerabilities attributed to at least a portion of the one or more end-user devices coupled to the at least one server coupled to the at least one out-of-band server management controller;
- to automatically disable at least a portion of the one or more end-user devices in response to the notification of one or more security vulnerabilities; and
- to provide at least a portion of the output to one or more enterprise security information event management tools, wherein providing the at least a portion of the output to the one or more enterprise security information event management tools comprises configuring at least a portion of the one or more enterprise security information event management tools with one or more rules, based at least in part on the at least a portion of the output, to classify at least one of one or more device attributes and one or more device settings as one or more security vulnerabilities in the one or more enterprise security information event management tools.

17. The apparatus of claim 16, wherein the configuration state information comprises one or more of firmware version information, update information, and dependency information.

18. The apparatus of claim 16, wherein collecting the data from the at least one out-of-band management controller comprises collecting data pertaining to firmware-related activity from the at least one out-of-band management controller, and collecting data pertaining to hardware-related activity from the at least one out-of-band management controller.

19. The apparatus of claim 16, wherein the one or more security vulnerabilities comprise at least one of a firmware attack, a signature failure, a pre-boot configuration error, a firmware compliance issue, and a driver compliance issue.

20. The apparatus of claim 16, wherein generating the one or more control state configuration profiles is based at least in part on information derived from one or more additional servers.

\* \* \* \* \*